Oct. 2, 1951     F. A. GRUETJEN     2,569,522
APPARATUS FOR UPSETTING EDGES
Filed Aug. 19, 1946     2 Sheets-Sheet 1
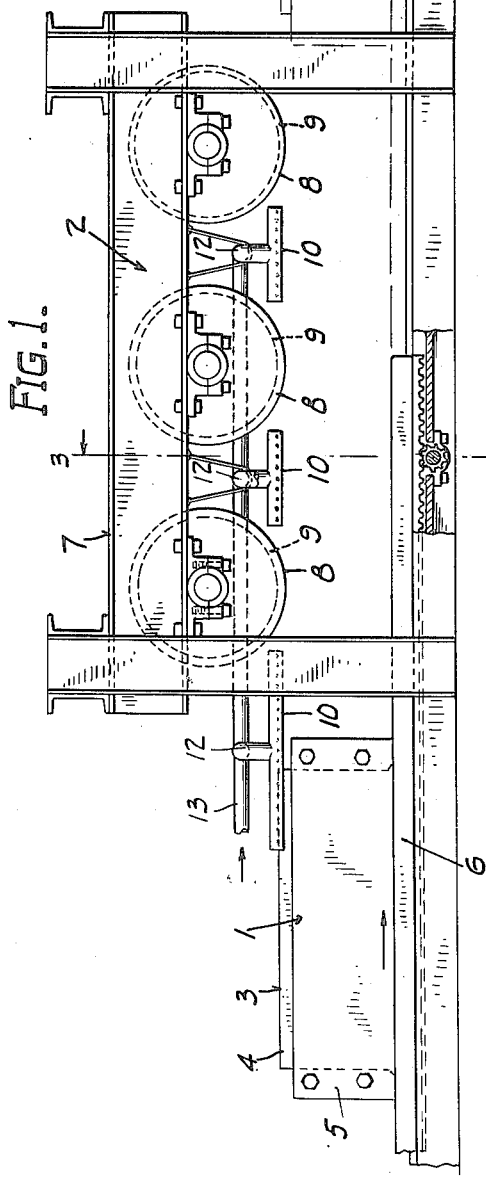
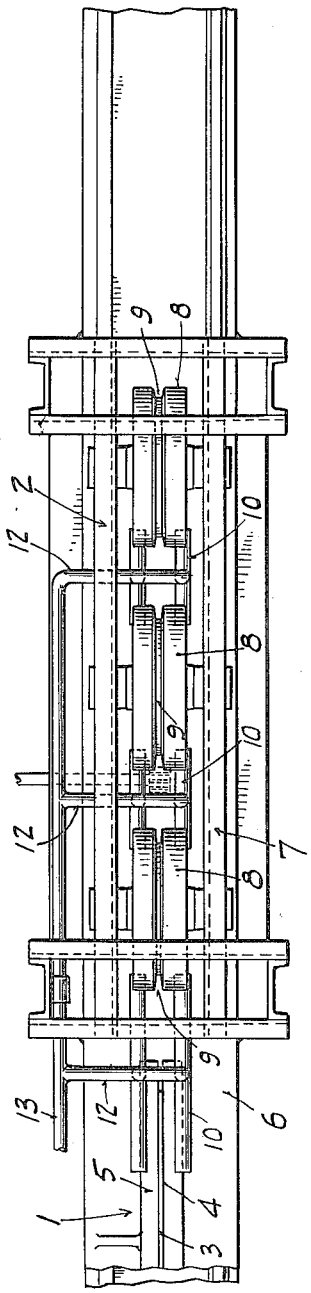
Frederick A. Gruetjen
INVENTOR.
BY
ATTORNEY.

Oct. 2, 1951     F. A. GRUETJEN     2,569,522
APPARATUS FOR UPSETTING EDGES
Filed Aug. 19, 1946     2 Sheets-Sheet 2
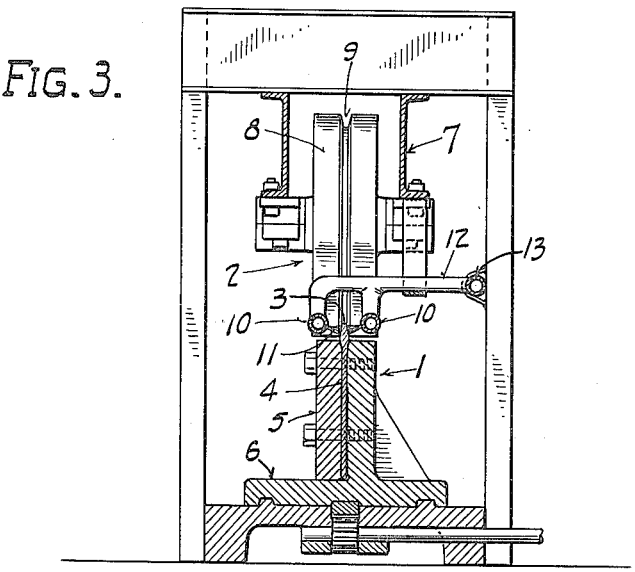
FIG. 3.
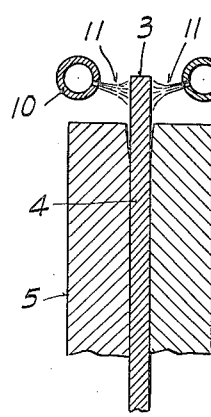 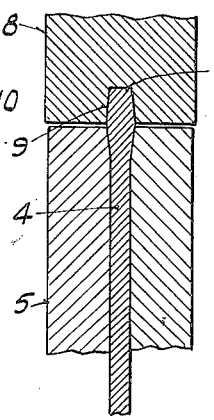 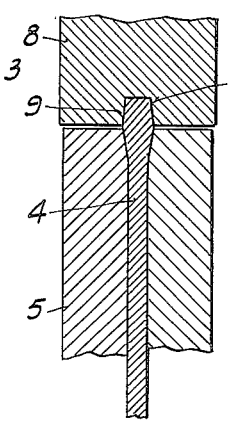 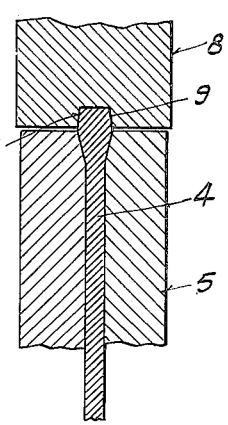
FIG. 4.    FIG. 5.    FIG. 6.    FIG. 7.
Frederick A. Gruetjen
INVENTOR.
BY
ATTORNEY.

Patented Oct. 2, 1951

2,569,522

UNITED STATES PATENT OFFICE 2,569,522

APPARATUS FOR UPSETTING EDGES

Frederick A. Gruetjen, Milwaukee, Wis., assignor to A. O. Smith Corporation, Milwaukee, Wis., a corporation of New York Application August 19, 1946, Serial No. 691,595

2 Claims. (Cl. 80—2)

This invention relates to upsetting of edges preparatory to welding and to apparatus for accomplishing the upset.

One object of the invention is to provide a method for upsetting the edges of high-strength, low-alloy, generally thin plate stock.

Another object of the invention is to provide means whereby the heated edges of generally thin plate stock are upset before the forging heat is dissipated or conducted into the metal in back of the upset and before such heat back becomes sufficient to injure the body or structure of the metal.

Another object of the invention is to provide a method of upsetting in which the thin plate stock being upset will not buckle or wrinkle under the pressure of the upset rollers.

Another object of the invention is to provide means for upsetting the edges of thin, high-strength sheet meal which will ensure constant, uniform dimensions of the edges to be butt welded.

Another object of the invention is to provide means for the upsetting of edges of thin, high-strength sheet metal which may be adapted to high-speed mass production without sacrificing precision or quality of work.

Another object of the invention is to provide a method of upsetting the edges of thin sheet metal to be butt welded having a single progressive heating and upsetting operation which will save time and eliminate the need of special handling of heated stock.

Another object of the invention is to provide a sure, certain means whereby the edges of thin sheet metal are heated to sufficient ductility for upsetting without danger of overheating the metal so that scale is formed and internal stresses set up.

Another object is to provide a method of upsetting edges of sheet metal, under which heat and pressure are applied to the edge portion of the sheet substantially simultaneously in successive steps of upsetting the edge.

Another object is to provide means whereby thin sheet metal may be uniformly heated preparatory to successive upsetting steps so that a uniform upset will be obtained.

These and other objects of the invention will appear hereinafter in connection with the following description of an embodiment of the invention illustrated in the accompanying drawings.

In the drawings:

Figure 1 is a side view of the assembly and work holder;

Fig. 2 is a top plan view of Figure 1;

Fig. 3 is a transverse section taken on line 3—3 of Figure 1 with the forward end of the workpiece between the first and second roller;

Fig. 4 is a detailed enlarged section of the edge of the workpiece before upset;

Fig. 5 is an enlarged section of the workpiece similar to Fig. 4 after upset by the first roller;

Fig. 6 is a view similar to Fig. 5 after upset by the second roller; and

Fig. 7 is a view similar to Fig. 5 after final upsetting.

The machine in general, comprises a work holder 1 and a roller die 2 mounted for relative movement to effect passage of the die longitudinally of the work holder along the exposed edge 3 of the workpiece 4 which is clamped and held in place by the jaws 5 of work holder 1. In the machine shown in the drawings work holder 1 is mounted on a movable carriage 6 while roller die 2 is mounted in a fixed framework 7. The jaws receive and hold the work 4 so that the edge 3 to be upset is exposed above the jaws.

The roller die is comprised of a plurality of die rollers 8 which in the drawing is shown as three in number.

The die rollers 8 are journalled for rotation in the die roller frame 7 and are shown as being of the same size and equally spaced successively from each other. The rollers are cylindrical and made of fire hardened die steel and may vary in size and distance from each other. The rollers however, should not be of a size preventing the upset stages from being spaced sufficiently close together.

Each die roller 8 is provided with the circumferentially extending central groove 9 and in operation edge 3 of the work enters and passes through the circumferential groove 9 of each roller under an upsetting pressure from the roller.

The grooves 9 are of substantial depth according to the nature of the work, and looking from the left in Fig. 2 the groove of each successive roll is of increasing width to obtain the gradual and successive upset desired. The width of each groove is determined by the size of the work, the size of the upset desired and the number of upset stages. The rollers should be removably mounted on frame 7 so that rollers having grooves of different widths may be substituted for varying work requirements.

At least two upset stages should be employed and in upsetting thin, high-strength plate it has been found that three stages of upset are successfully employed.

The depth of grooves 9 should be sufficient to prevent the stock from being buckled or wrinkled by the pressure of the rollers 8 but not so great that excessive die wear is entailed. The grooves may be of any suitable cross-section according to the cross-section desired for the finished edge.

Edge 3 of the work to be upset is heated prior to passing under each roller by the respective heating elements 10.

The heating elements 10 are normally provided by burners which are suitably mounted on frame 7 with two of the burners being located one between each roll and the other or first burner being disposed at the entrance to the first roll 8. Each respective burner 10 has opposing jets 11 and produces a heating zone along a line corresponding to the line of travel of edge 3 of the work 4 to be upset. Each burner is individually controlled by means not shown in the drawings and suitable gas is conducted to the burners through pipes 12 and the header 13 which is connected to a source, not shown.

The size and length of each burner is determined by the speed with which the work passes through the heating zones and the amount of heating required to bring the edge to be upset to forging temperature. The first burner is of greater length than the other two burners to initially heat the cold edge 3 to the temperature desired within a minimum of time. If additional rollers than those shown in the drawing are employed, each roller is preceded by a burner 10.

Means whereby the work may be indexed with the roller and adjustments for sizes of work and different upset pressures may be provided by means of lateral and upward feed movements of the work holder 1 or by adjustments of the die rollers 8 on frame 7.

In carrying out the invention, as illustrated in the drawings, the workpiece 4 is first clamped within the jaws 5 of work holder 1 in longitudinal alignment with die rollers 8 with the longitudinal edge 3 to be upset exposed above the jaws. As shown in Figs. 4–7 of the drawings jaws 5 immediately below edge 3 and adjacent the workpiece are tapered slightly to receive a portion of the upset metal when rollers 8 upset edge 3. At this time the carriage 6 is at the forward side of roller die 2. The operator then manipulates the controls, not shown, to move the carriage carrying workpiece 1 beneath the roller die 2. As the carriage moves forward, the edge 3 which then has a cross-section as shown in Fig. 4, passes between the jets of the first or large burner 10 and is brought to forging temperature thereby.

Immediately thereafter edge 3 passes through groove 9 of the first die roller 8 which engages the edge and applies pressure and upsets the edge within groove 9 to the shape shown in Fig. 5 with a portion of the metal flowing into the tapered opening provided by jaws 5. The edge 3 of workpiece 4 then passes into the second burner 10 where it is restored to forging temperature. From the second burner the edge of workpiece 4 moves on into groove 9 of the second die roller 8 where it is upset within the groove under pressure to approximately the cross-section shown in Fig. 6. The heating process is repeated by the third burner 10 as the workpiece moves forwardly and the third die roller then upsets the edge to the final cross-section as shown in Fig. 7. The speed at which the workpiece is carried through the burners and rollers depends on the composition of the workpiece, the forging temperature employed and the amount of upset desired.

Thin steel stock of high tensile strength cannot be readily upset without heating because the body of the workpiece is insufficient to support and withstand the pressure required to accomplish the upset and is easily buckled or wrinkled. Heating the work to forging temperature reduces the pressure needed to effect the upset. However, thin stock is easily overheated and the strength and temper of high strength steel is easily impaired when the forging heat is prolonged and dissipated into the body of the stock. Under the method of the invention dissipation of the heat is substantially eliminated since the heating and upsetting is a momentary operation. In addition, the heat applied is directed and confined to the edge to the upset and the heating and upsetting is accomplished before any appreciable amount of heat passes into the body of the work to weaken or injure its structure.

Various embodiments of the invention may be employed within the scope of the accompanying claims.

I claim:

1. Apparatus for progressively upsetting an edge of a thin sheet metal blank, comprising a base having a guide way thereon, a carriage disposed for longitudinal movement upon said guide way, a work holder upon said carriage adapted to clamp a thin sheet metal blank on edge and to confine and support the body of the blank with its upper edge to be upset extending parallel to the direction of movement of the carriage, a frame extending upwardly from and supported on said base and having cross members disposed above the path of movement of said blank edge, a plurality of die rolls carried by said frame cross members and having circumferential grooves disposed to engage the blank edge and form the same progressively as the carriage moves the blank longitudinally beneath the rolls to successively forge the blank edge by progressive increments, said base and guide way extending beyond said frame at least at one end to provide ready access to the carriage for loading and unloading the same, and means to move the carriage upon said guide way.

2. The apparatus of claim 1 in which said clamp is constructed to confine the body of the blank and to extract any forging heat therefrom to maintain the same at a self supporting temperature, and heating burners are provided ahead of each roll to heat only an exposed portion of the blank edge to be upset.

FREDERICK A. GRUETJEN.

REFERENCES CITED

The following references are of record in the file of this patent:

UNITED STATES PATENTS

| Number | Name | Date |
|---|---|---|
| 886,831 | Richards | Apr. 28, 1908 |
| 1,180,047 | Kobert | Apr. 18, 1916 |
| 1,203,888 | McKibbin | Nov. 7, 1916 |
| 1,479,228 | De Lapotterie | Jan. 1, 1924 |
| 1,684,950 | Dornself | Sept. 18, 1928 |
| 1,963,724 | Taylor | June 19, 1934 |